(12) United States Patent
Hosono et al.

(10) Patent No.: US 6,307,724 B1
(45) Date of Patent: Oct. 23, 2001

(54) ACCESSORY APPARATUS

(75) Inventors: Yutaka Hosono; Teruaki Yagoshi; Kazuo Shimada, all of Kawasaki (JP)

(73) Assignee: Fujitsu, Limited, Kawasaki (JP)

( * ) Notice: Subject to any disclaimer, the term of this patent is extended or adjusted under 35 U.S.C. 154(b) by 0 days.

(21) Appl. No.: 09/497,188

(22) Filed: Feb. 3, 2000

(30) Foreign Application Priority Data

Jun. 17, 1999 (JP) .................................................. 11-171076

(51) Int. Cl.$^7$ ....................................................... H02H 3/18
(52) U.S. Cl. ............................................. 361/86; 361/91.6
(58) Field of Search ........................... 361/86, 91.1, 91.5, 361/91.6, 56, 111, 118

(56) References Cited

U.S. PATENT DOCUMENTS 5,291,365 * 3/1994 Takagi ...................................... 361/56

FOREIGN PATENT DOCUMENTS

| | | |
|---|---|---|
| 53-110382 | 9/1978 | (JP) . |
| 62-95926 | 5/1987 | (JP) . |
| 7-302145 | 11/1995 | (JP) . |
| 8-87457 | 4/1996 | (JP) . |
| 9-93798 | 4/1997 | (JP) . |
| 10-271679 | 10/1998 | (JP) . |

* cited by examiner

Primary Examiner—Michael J. Sherry
(74) Attorney, Agent, or Firm—Armstrong, Westerman, Hattori, McLeland & Naughton, LLP

(57) ABSTRACT

There is provided a device in an accessory apparatus, which is connected with a main apparatus, for protecting a motor driver IC and a logic circuit in the accessory apparatus from the application of a voltage higher than the rated voltage for these circuits, when the connection between the main apparatus and the accessory apparatus (optional apparatus) which receives power from the main apparatus enters an abnormal state. Therefore, even when the power of the main apparatus is ON, the accessory apparatus can be attached to, or removed from, the main apparatus without damaging the circuits. The device comprises an inexpensive element, such as a rectifying diode or a Zener diode.

8 Claims, 14 Drawing Sheets

ACCESSORY APPARATUS

BACKGROUND OF THE INVENTION

1. Field of the Invention

The present invention relates to an accessory apparatus, attached to a main apparatus such as a printer, for which the operating power is supplied by the main apparatus, and relates in particular to a method for protecting a circuit in the accessory apparatus from abnormal voltages.

2. Related Arts

For a peripheral apparatus such as a printer or a computer, an accessory apparatus such as an image reader, may be connected to the main body of the peripheral apparatus (hereinafter referred to as a main apparatus). For example, if the main apparatus is a printer, an accessory apparatus (hereinafter referred to as an optional apparatus) can be a feeder unit for supplying sheets in a plurality of sizes to the main apparatus, or a double-sided printing unit for printing both sides of a sheet.

FIGS. 14A and 14B are diagrams for explaining a method used for connecting optional apparatuses to a main apparatus. In FIG. 14A, a main apparatus and each of two optional apparatuses are connected by a cable (an arrangement hereinafter referred to as a cable connection). Connectors provided at the ends of the cable are inserted into receptacles on the main apparatus and the optional apparatus. In FIG. 14B, connectors on a main apparatus and an optional apparatus are used to make a direct connection (such an arrangement is hereinafter referred to as a connector connection). Connectors on the optional apparatuses are also used to make a connector connection. Power for optional apparatuses which are thus connected to a main apparatus is supplied by the main apparatus.

Generally, when the cable connection shown in FIG. 14A is used, an electrical connection of a main apparatus and an optional apparatus is not established merely by mounting the optional apparatus on the main apparatus; a cable must be installed to connect the units. Also, if the optional apparatus is removed from the main apparatus but the two units are still connected by the cable, the electrical connection is maintained. With the connector connection shown in FIG. 14B, however, the electrical connection between the main apparatus and the optional apparatus is established when the optional apparatus is mounted on the main apparatus. In this case, the electrical connection is lost when the optional apparatuses is removed from the main apparatus.

FIG. 15 is a diagram showing an example connector used for the above connector connection. In FIG. 15, the connectors used for the connector connection are rack panel connectors, for example, mini-drawer connectors produced by AMP Corp. The rack panel connectors in FIG. 15 have like shaped male and female housings which engage each other. It should be noted that the male and female contact terminals of the rack panel connectors also have the same shape. The rack panel connectors, which are directly attached to a main apparatus or an optional apparatus, have a floating function which enables them to absorb attachment positioning errors. These connectors may be so attached that they can be displaced a predetermined distance (e.g., about 1 mm).

When the optional apparatus connected to the main apparatus using a connector is to be detached while the power source of the main apparatus is ON, the following problem arises. When, for example, the optional apparatus is attached to the main apparatus which is in the power-ON state, and the timing for the coupling of the power supply pins (e.g., +5 V or +24 V) of the connectors is shifted from the timing for the coupling of the power GND pins, an overvoltage will be applied to various circuits provided in the optional apparatus, and deterioration or damage to the circuits will occur.

When, for example, the optional apparatus is to be attached to the main apparatus which is in the power-ON state, the power supply pins for the +24 V connectors may be coupled together before the power GND pins are engaged. Then, either a current by +24 V supplied from the main apparatus, will not flow its normal route and will flow in reverse along a motor drive circuit in the optional apparatus, or an overvoltage will be applied to a control logic circuit in the optional apparatus, for which an operating voltage of +5 V is required. Thus, the motor drive circuit or the control logic circuit in the optional apparatus may be damaged, and the optional apparatus failure may occur.

In addition, when the optional apparatus is removed from a main apparatus in the power-ON state, the power GND pins of the connectors may be disengaged before the +24 V power supply pins. Then, as in the above case, since there is no contact between the GND pins, a voltage of +24 V will be supplied to the optional apparatus, and the motor drive circuit and the control logic circuit in the optional apparatus may be damaged and cause an optional apparatus failure.

In particular, as is described above, since with the connector connection the detachment of the optional apparatus from the main apparatus is easy, it is highly probable that the operator will erroneously remove the optional apparatus from the main apparatus which is in the power-ON state.

SUMMARY OF THE INVENTION

It is, therefore, one objective of the present invention to provide an accessory apparatus (optional apparatus) with which damage to internal circuits is prevented, even when the accessory apparatus is detached from the main apparatus which is in the power-ON state.

To achieve the above objective, according to the present invention, there is provided an accessory apparatus which is connected to a main apparatus and receives power from a power source of the main apparatus, comprising:

a connector including a first terminal to be connected to a first power potential of the main apparatus, a second terminal to be connected to a second power potential of the main apparatus, and a third terminal to be connected to a ground potential of the main apparatus;

a first circuit to be connected to the first, second and third terminals; and a first device for preventing the first circuit from being applied a voltage higher than a rated voltage of the first circuit in a direction from the third terminal to the first terminal in case that the second terminal is connected to the second power potential of the main apparatus with the first terminal being connected to the first power potential of the main apparatus, without the third terminal being connected to the ground potential of the main apparatus.

With this arrangement, first circuit damage, which results from the application to the first circuit of a voltage higher than the first circuit's rated voltage, can be prevented.

For example, the first device is an element (rectifying diode) which is connected in parallel to the first circuit between the third terminal and the first terminal, and which conducts a current in a direction from the third terminal to the first terminal. The first device also may be an element (rectifying diode) which is connected in series to the first circuit between the third terminal and the first terminal, and which conducts a current in a direction from the first terminal to the third terminal. Since the diode is employed as the first device, damage to the first circuit can be prevented by the employment of only one an inexpensive element.

Furthermore, the connector includes a fourth terminal to be connected to the ground potential of the main apparatus, the accessory apparatus further comprises:

a second circuit to be connected to the first and the fourth terminals; and a second device for preventing the second circuit from being applied a voltage higher than the rated voltage of the second circuit in a direction from the first terminal to the fourth terminal in case that the second terminal is connected to the second power potential of the main apparatus with the fourth terminal being connected to the ground potential of the main apparatus, without the first terminal being connected to the first power potential of the main apparatus, without the third terminal being connected to the ground potential of the main apparatus.

With this arrangement, second circuit damage, which is caused by application to the second circuit of a voltage higher than the second circuit's rated voltage, can be prevented.

For example, the second device is an element (a Zener diode) which is connected in parallel to the second circuit between the first terminal and the fourth terminal, and which conducts a current in a direction from the first terminal to the fourth terminal. Since the Zener diode is employed as the second device, damage of the second circuit can be prevented by the employment of only one inexpensive element.

DETAILED DESCRIPTION OF THE PREFERRED EMBODIMENTS

The preferred embodiments of the present invention will now be described while referring to the accompanying drawings. It should be noted, however, that the technical scope of the present invention is not limited to these embodiments. An optional apparatus installed for a printer, which is a main apparatus, is employed for the embodiments.

Figure 1:
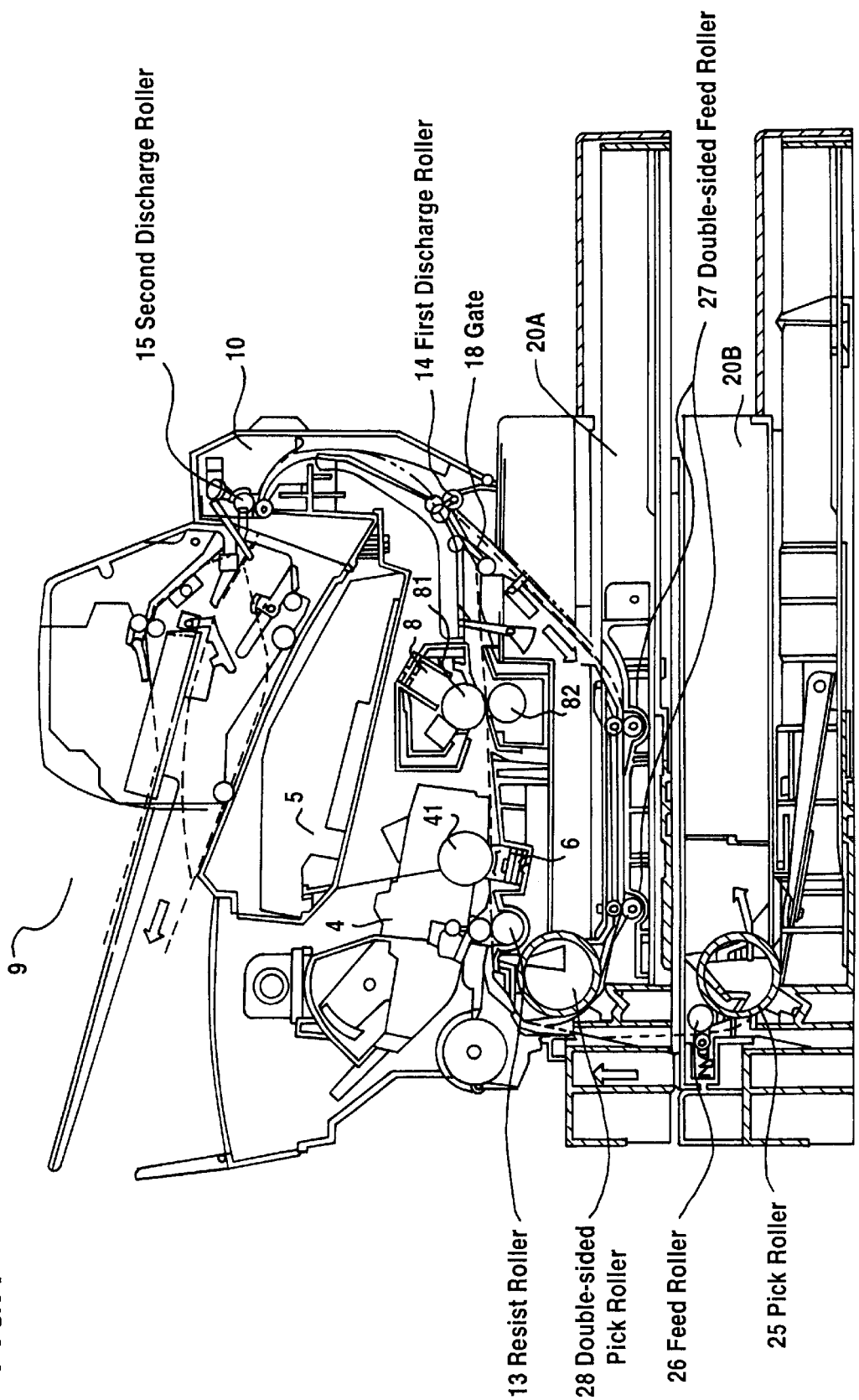
FIG. 1 is a diagram showing the internal arrangement of a printer.

FIG. 1 is a diagram illustrating the internal arrangement of a printer. A printer (main apparatus) 10 comprises a printer unit 4, an optical unit 5, a transfer unit 6, a fixing unit 8, and a stacker 9. The printer unit 4 includes a photosensitive drum 41 used for forming a visible image to be transferred to a sheet, a developing unit, a cleaner, and an electrification unit (not shown).

In order to form an image to be transferred to a sheet, first, the photosensitive drum 41 is uniformly electrified by the electrification unit. The optical unit 5 then exposes the photosensitive drum 41, in accordance with print data received from an upper apparatus, and forms a latent image thereon. Following this, the latent image is developed by the developing unit, and a visible toner image is formed thereby on the photosensitive drum 41. This visible image is transferred to a sheet by a transfer unit 6, which is located opposite the photosensitive drum 41 with an intervening sheet feeding path. Subsequently, the fixing unit 8 sandwiches a sheet between a heating roller 81 and a pressure roller 82, and uses heat and pressure to soften the toner and to fix the toner image to the sheet.

A paper supply unit 20B and a double-sided printing unit 20A, which are optional apparatuses, are provided under the printer 10. To print a sheet using the printer 10, one sheet is extracted from the paper supply unit 20B, from which sheets are fed individually, and is transferred upstream by a feed roller 26. The sheet is conveyed further by a resist roller 13, and the toner image formed by the printer unit 4 is transferred to the sheet. Then, the sheet bearing the toner image is fed to the fixing unit 8, whereat the toner image is fixed to the sheet. The resultant sheet is transferred by first and second discharge rollers 14 and 15, and is discharged to a stacker 9.

To feed a sheet from the paper supply unit 20B to the printer 10, a motor in the paper supply unit 20B is driven and rotates a pick roller 25 and a feed roller 26. As the pick roller 25 is rotated, sheets are individually extracted from the paper supply unit 20B and are transferred upstream. Thereafter, as the feed roller 26 is rotated, the sheets are fed to the printer 10 for printing.

For double-sided printing, the single-sided printing process described above is performed for the obverse surface of a sheet, and the resultant sheet is conveyed by the first and second discharge rollers 14 and 15 until the trailing edge of the sheet has passed through a gate 18. The gate 18 is normally driven by a spring so that it blocks the feeding path from the fixing unit 8 to the stacker 9.

The gate 18 is rotated in a direction which opens the feeding path leading from the fixing unit 8 to the stacker 9, and permits the sheet to pass through. When the trailing edge of the sheet has passed through the gate 18, the gate 18 is rotated and is repositioned so that the feeding path is closed. At the time the trailing edge of the sheet passes through the gate 18, the first and the second discharge rollers 14 and 15 are rotated in reverse to feed the sheet in the opposite direction. The sheet is thus transferred via the gate 18 to the double-sided printing unit 20A. The sheet is thereafter fed by a double-sided feed roller 27 and a double-sided pick roller 28 to the resist roller 13.

Following this, the sheet is again fed by the resist roller 13, and the reverse side of the sheet is printed as in the above described single-sided printing process. When both sides of the sheet have been printed, the fixing unit 8 also fixes the reverse side of the sheet, and the resultant sheet is discharged to the stacker 9 by the first and the second discharge rollers 14 and 15.

The paper supply unit 20A and the double-sided printing unit 20A are optional apparatuses which the user of the printer 10 can additionally install as needed. In order to facilitate the printing of a plurality of paper sizes, a paper supply unit 20B can be provided in accordance with the type of paper which is to be used. Further, the installation of a double-sided printing unit 20A can be based on the need to perform double-sided printing.

Figure 2:
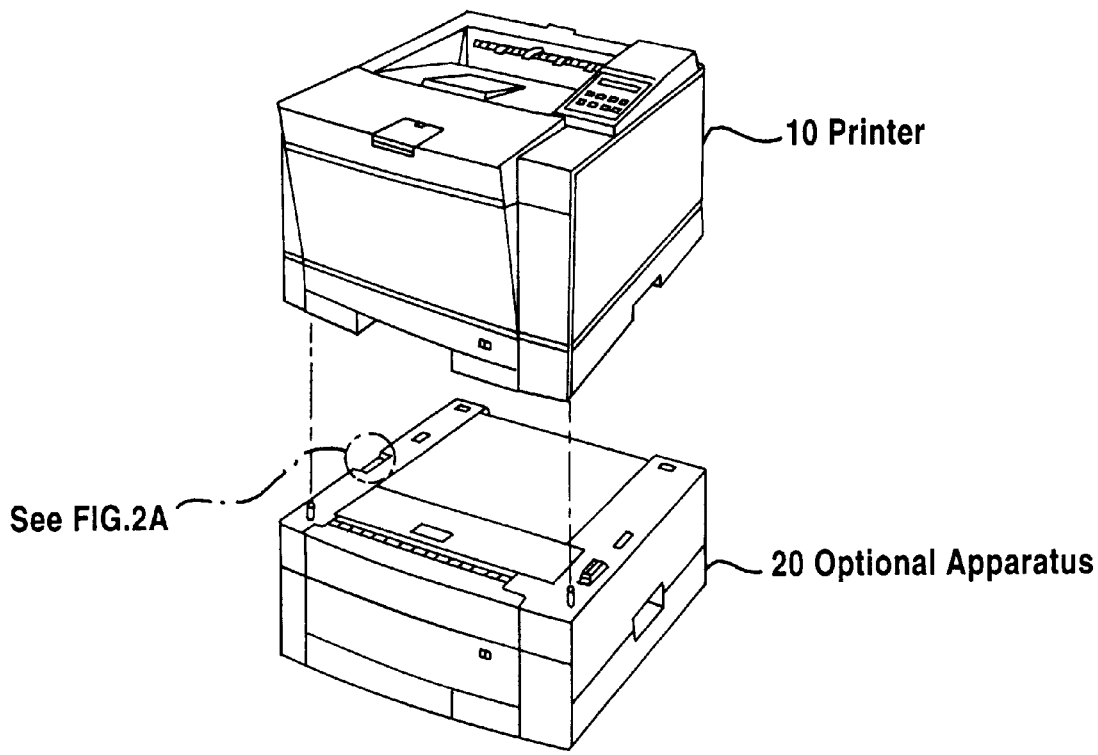
FIG. 2 is a diagram showing the connection of the printer and an optional apparatus.
Figure 2A:
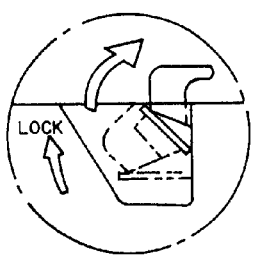

FIG. 2 is a diagram showing the connection of the printer and the optional apparatuses. As is shown in FIG. 2, the printer 10 is stacked on the optional apparatuses 20. Included in the printer 10 and the optional apparatus 20 are mechanisms for locking the units together.

As is described above, an optional apparatus such as a paper supply unit 20B or a double-sided printing unit 20A, includes rollers (a pick roller, a feed roller, etc.) which are rotated or stopped in accordance with the paper feeding condition. These rollers are rotated and stopped in accordance with instructions received from the printer 10. Therefore, for each of the optional apparatuses a motor and a motor drive IC to control the motor are provided. The power voltages required to drive the motor and the motor drive IC differ. For example, a voltage of +24 V may be require to drive the motor, and a voltage of +5 V may be required to drive the motor drive IC. In order to prevent a rise of the costs of the optional apparatuses due to a need to provide individual power sources for the motor and the motor drive IC, the power for the motor and the motor drive IC is supplied by the printer 10.

Figure 3:
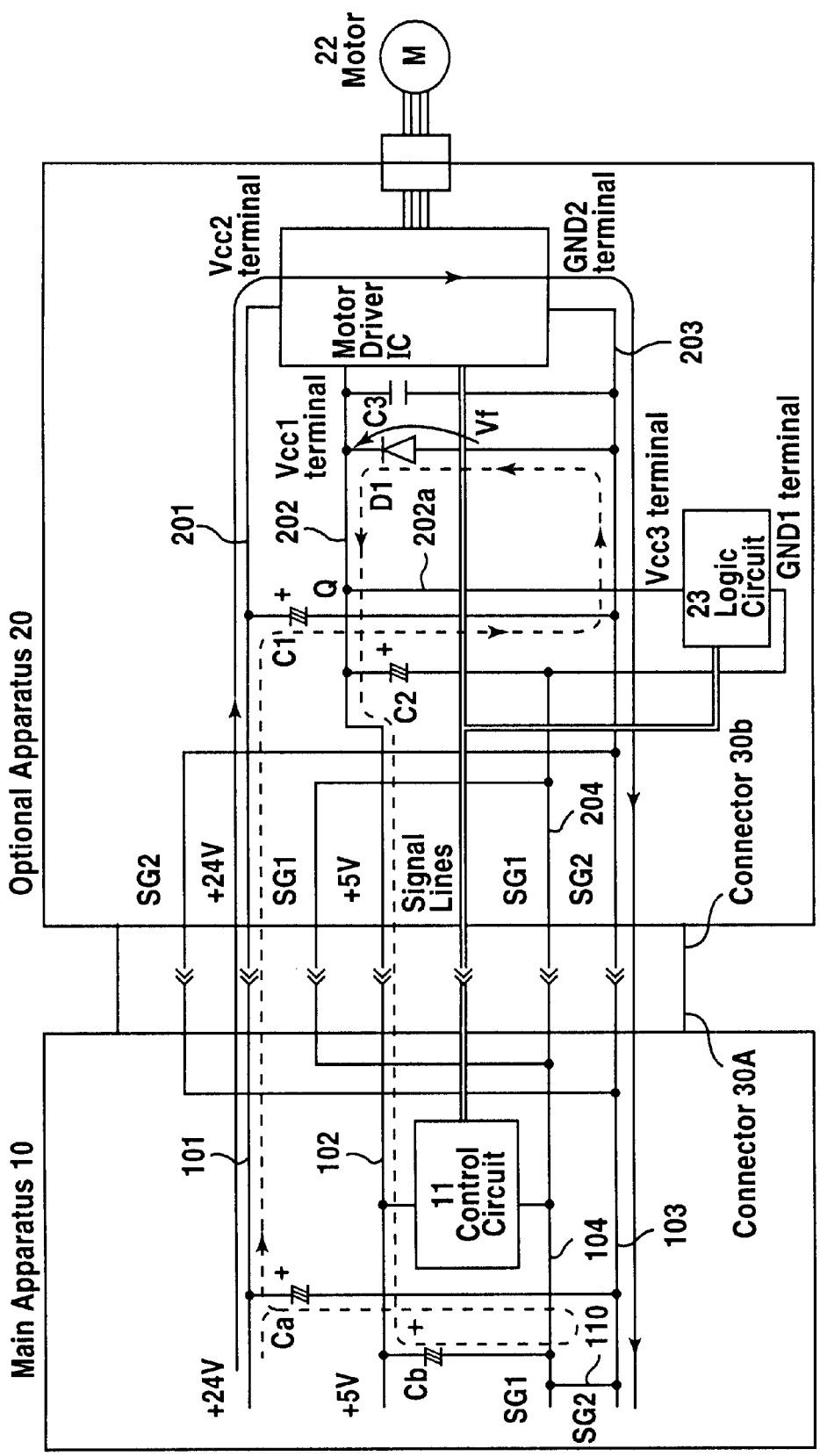
FIG. 3 is a circuit diagram illustrating an optional apparatus according to a first embodiment of the present invention.
Figure 14A:
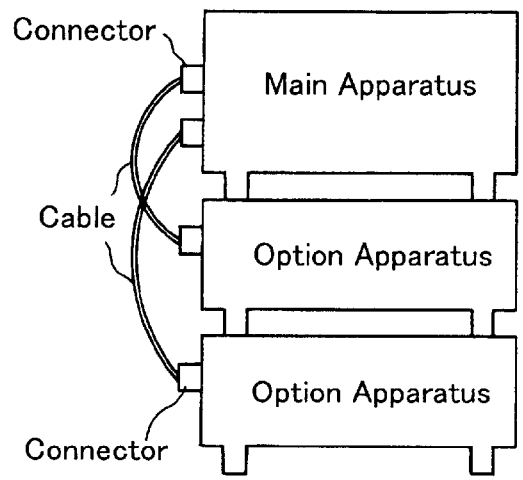
FIGS. 14A and 14B are diagrams for explaining connection methods for a main apparatus and optional apparatuses.
Figure 14B:
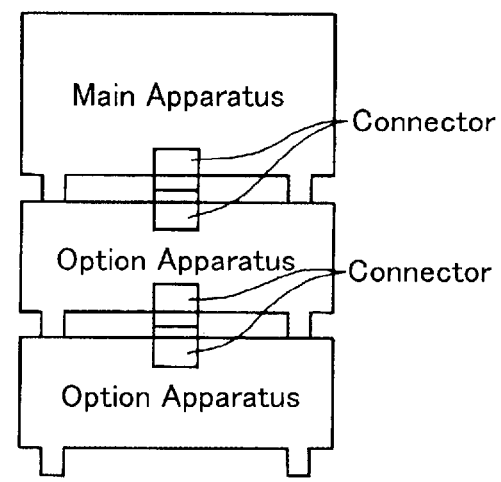
Figure 15:
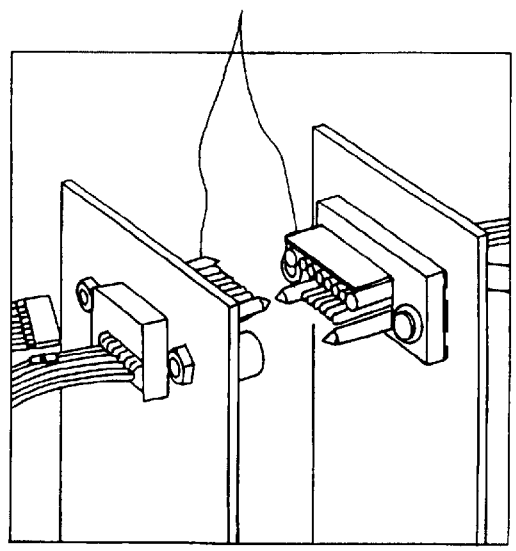
FIG. 15 is a diagram showing example connectors used for connector connection.

The circuits of the optional apparatus according to the present invention will now be described. FIG. 3 is a circuit diagram showing an optional apparatus according to a first embodiment of the present invention. While referring to FIG. 3, an explanation will now be given for an example wherein, as is shown in FIG. 14B, a main apparatus 10 and an optional apparatus 20 are connected together directly at their connectors. The main apparatus 10, which includes a +24 V power source for driving a motor (not shown) and a +5 V power source for driving a logic circuit, such as a control circuit 11, also supplies these voltages also to the optional apparatus 20. When the terminals in a connector 30A on the main apparatus 10 engage those in a connector 30B on the optional apparatus 20, the connection of the individual lines, which will be explained below, is established.

A +24 V power line 101 in the main apparatus 10 is connected via the +24 V pins (terminals) of the connectors 30A and 30B to a +24 V power line 201 in the optional apparatus. The +24 V power line 201 is connected to the Vcc2 terminal for a motor driver IC 21 to supply an operating voltage of +24 V to the motor driver IC 21. Upon the receipt of the +24 V operating voltage, the motor driver IC 21 begins to drive a motor 22 in the optional apparatus 20. A +5 V power line 102 in the main apparatus 10 is connected to a +5 V power line 202 in the optional apparatus 20 by connecting the +5 V pins (terminals) of the connectors 30A and 30B. The +5 V power line 202 is connected to the Vcc1 terminal of the motor driver IC 21 to supply an operating voltage of +5 V to the motor driver IC 21. The +5 V operating voltage supplied to the motor driver IC 21 is used to drive a logic circuit (not shown) incorporated in the motor driver IC 21. Further, a +5 V power line 202a, which branches from the +5 V power line 202 at branch point Q, is connected to the Vcc3 terminal of a logic circuit 23. The logic circuit 23 receives an operating voltage of +5 V which it uses to control the overall operation of the optional apparatus 20.

The GND2 terminal of the motor driver IC 21 in the optional apparatus 20 is connected via an SG2 line 203 of the optional apparatus 20 and the SG2 pins (terminals) of the connectors 30A and 30B to an SG2 line 103 in the main apparatus 10 having a ground potential SG2 of 0 V. The GND1 terminal of the logic circuit 23 in the optional apparatus 20 is connected via an SG1 line 204 and the SG1 pins (terminals) of the connectors 30A and 30B to an SG1 line 104 in the main apparatus having the ground potential of 0 V. It should be noted that the connectors 30A and 30B include, for example, two SG1 pins and two SG2 pins, and that the SG1 lines 104 and 204 and the SG2 lines 103 and 203 are connected in parallel to the two SG1 pins and the two SG2 pins. This is because the probability that the SG1 pins and the SG2 pins will be disconnected is reduced, and thus the possibility that an abnormal voltage will be applied to the individual circuits of the optional apparatus 20 is prevented to the extent possible.

In the main apparatus 10, the +24 V power line 101 and the SG2 line 103 are connected via a capacitor Ca, and the +5 V power line 102 and the SG1 line 104 are connected via a capacitor Cb. In the optional apparatus 20, the +24 V power line 201 and the SG2 line 203 are connected via a capacitor C1, and the +5 V power line 202 and the SG1 line 204 are connected via a capacitor C2. The SG2 line 103 and the SG1 line 104 are connected via a line 110 in the main apparatus 10.

A rectifying diode D1, which is the feature of this embodiment, is mounted in parallel to the motor driver IC 21 and connects the SG2 line 203 and the +5 V power line 202 (the forward direction of the diode D1 is the direction leading from the SG2 line 203 to the +5 V power line 202).

When the connectors 30A and 30B normally engage each other in this circuitry, as is indicated by solid lines in FIG. 3, a current from the +24 V power line 101 of the main apparatus 10 flows along the +24 V line 201 of the optional apparatus 20, is input to the Vcc2 terminal of the motor IC 21, and is output from the GND2 terminal. Thereafter, the current flows normally from the SG2 line 203 through the connectors 30A and 30B to the SG2 line 103 of the main apparatus 10.

Next, assume that a connection abnormality occurs between the connectors 30A and 30B. For example, assume a first abnormal state is established where only the SG2 pins of the connectors 30A and 30B have not yet been connected when the optional apparatus 20 is attached to the main apparatus 10.

Figure 4:
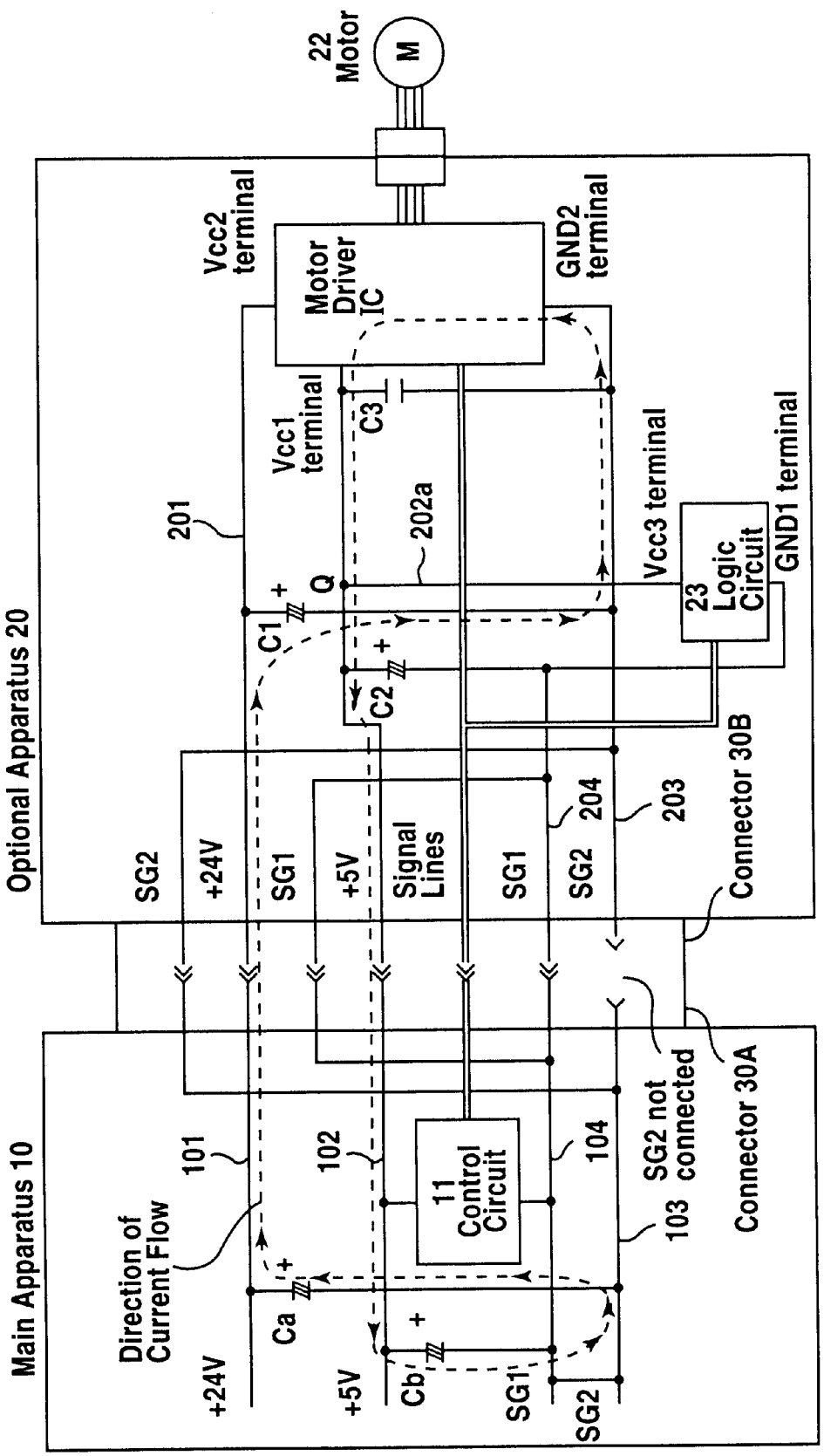
FIG. 4 is a diagram for explaining the flow of a current, in a first abnormal state, when a diode D1 is not connected.

Initially, in this first abnormal state, assume that the diode D1 is not connected. FIG. 4 is a diagram for explaining the flow of a current in this case. As is indicated by broken lines in FIG. 4, if the SG2 pins are not connected, a current from the +24 power line 101 flows across the SG2 line 203 by immediately charging the capacitor C1, enters the motor driver IC 21 via the GND2 terminal of the motor driver IC 21, and is output at the Vcc1 terminal.

Figure 5A:
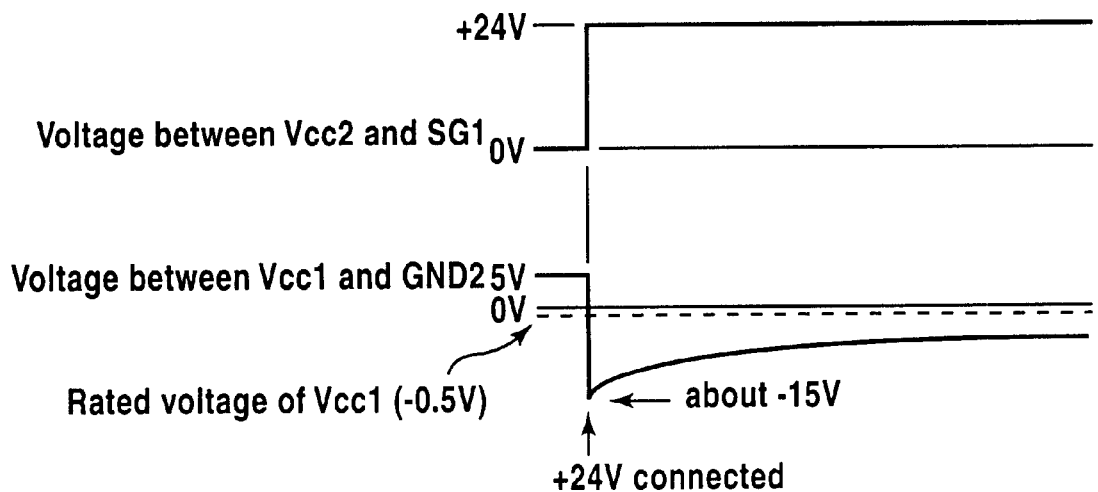
FIGS. 5A and 5B are graphs showing a voltage waveform in the first abnormal state.
Figure 5B:
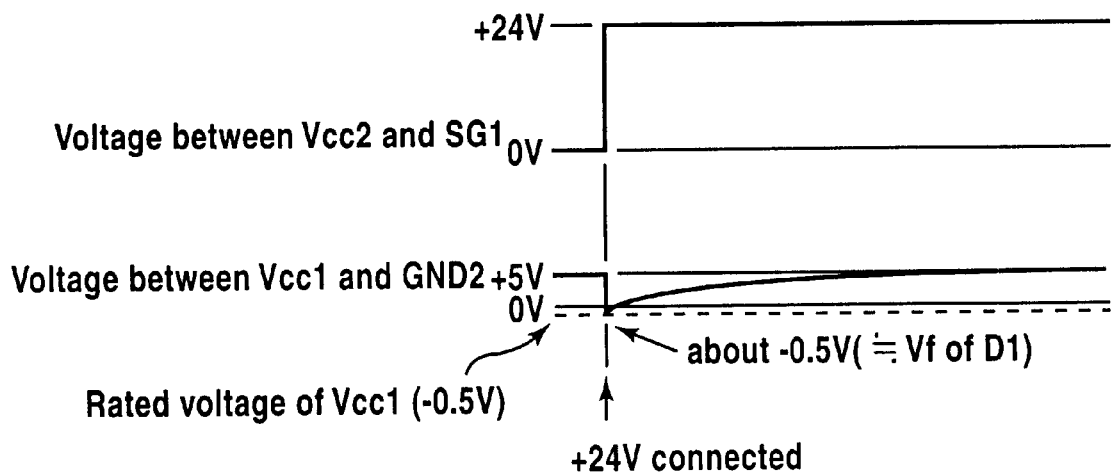

FIGS. 5A and 5B are graphs showing a voltage waveform in the first abnormal state. FIG. 5A is a graph showing a voltage waveform when the diode D1 is not connected. In FIG. 5A, when a +24 V operating voltage is applied between the Vcc2 terminal of the motor driver IC 21 and the SG1, an operating voltage of approximately +20 V is applied from the GND2 terminal side to the Vcc1 terminal. It should be noted that this voltage drop depends on the static capacitance of the capacitor C1. The +5 V is applied to the Vcc1 terminal from the +5 V power line 202 side. Therefore, a reverse voltage of about –15 V (5 V–20 V) is applied between the Vcc1 terminal and the GND2 terminal. Since this voltage exceeds the rated voltage (–0.5 V) of the Vcc1 terminal, the motor driver IC 21 is damaged.

FIG. 5B is a graph showing a voltage waveform when the diode D1 is connected. In FIG. 5B, if, as in FIG. 5A, an operating voltage of +24 V is applied to the Vcc2 terminal of the motor driver IC 21 and the SG1, a current flows through the diode D1 in the forward direction, as is indicated by the broken line in FIG. 3. That is, the voltage applied between the Vcc1 terminal and the GND2 terminal is approximately –0.5 V, in accordance with the forward direction voltage Vf (about 0.5 V) of the diode D1, and falls within the rated voltage (–0.5 V) for the Vcc1 terminal. Therefore, damage to the motor driver IC 21 can be avoided. As a result, even when the main apparatus 10 is in the power-ON state, the optional apparatus 20 can be attached to or removed from the main apparatus 10, without damaging the motor driver IC 21.

Figure 6:
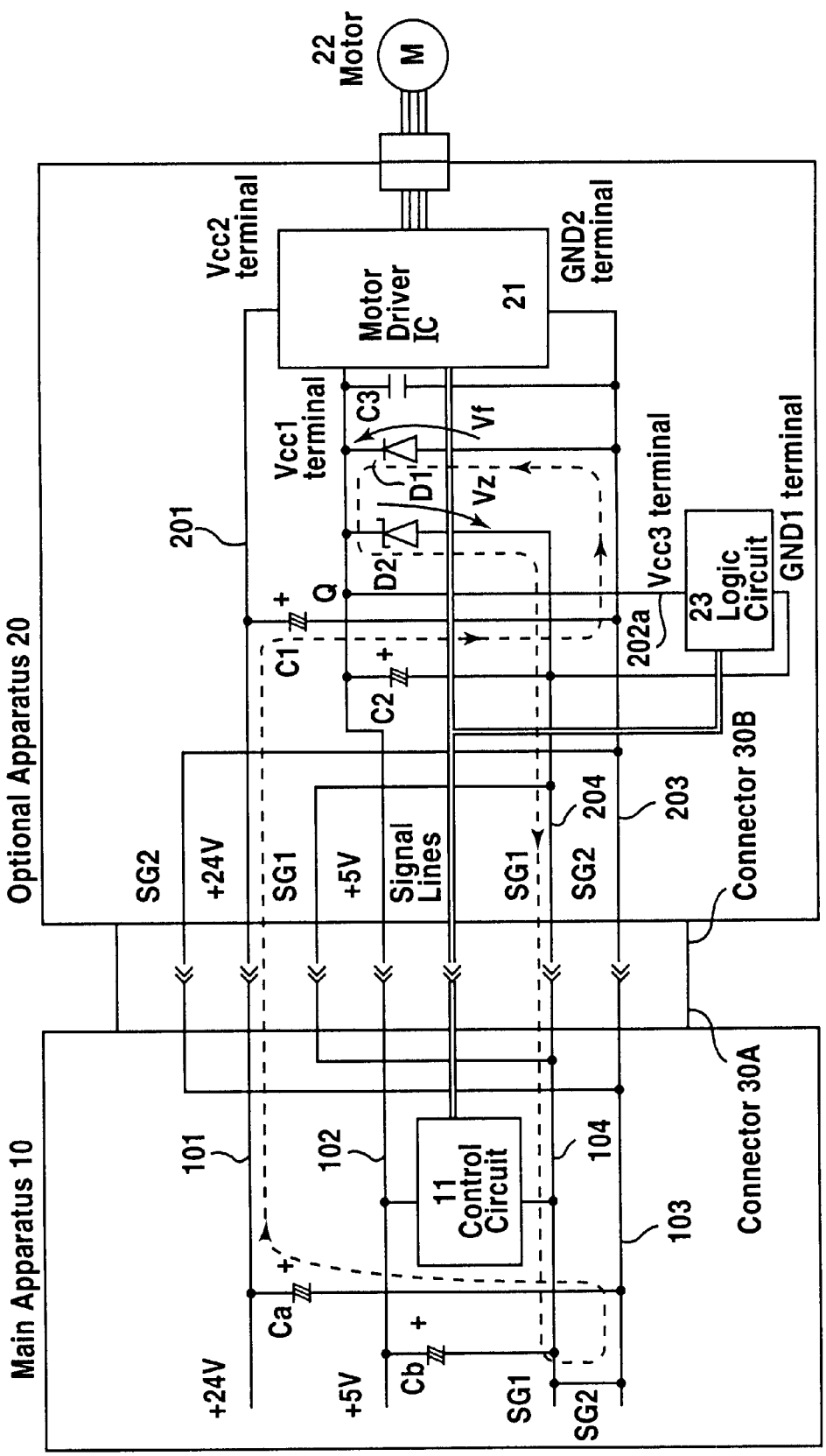
FIG. 6 is a circuit diagram illustrating an optional apparatus according to a second embodiment of the present invention.

FIG. 6 is a circuit diagram showing an optional apparatus according to a second embodiment of the present invention. In FIG. 6, in addition to the diode D1 in FIG. 3, a Zener diode D2 is so located that it connects the SG1 line 204 to the +5 V power line 202 (the forward direction of the Zener diode D2 is the direction leading from the SG1 line 203 to the +5 V power line 202). The Zener voltage Vz (a voltage which breaks down in the opposite direction) of the Zener diode D2 is set at about 5 to 6 V. In this embodiment, assume in a second abnormal state, not only the SG2 pins of connectors 30A and 30B, but also the +5 V pins are not connected. Initially, in the second abnormal state, assume that the diode D1 is connected but that the Zener diode D2 is not.

Figure 7:
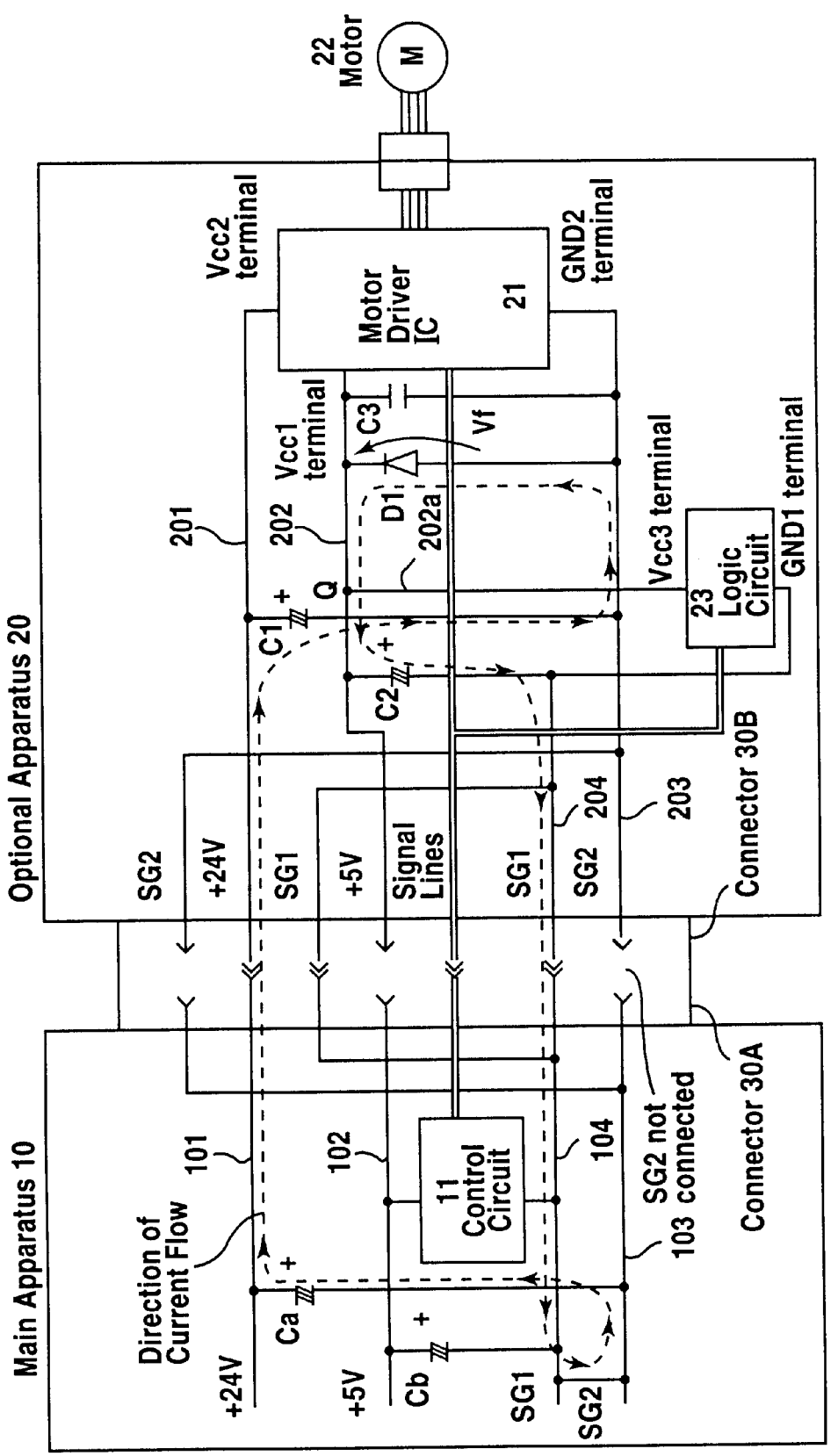
FIG. 7 is a diagram for explaining the flow of a current, in a second abnormal state, when a diode D2 is not connected.

FIG. 7 is a diagram for explaining the flow of a current in the second abnormal state. As indicated by broken lines in FIG. 7, when the +5 V pins are not connected, a current flowing through the diode D1 in the forward direction is transmitted to the SG1 line 204 by the immediate charging of a capacitor C2.

Figure 8A:
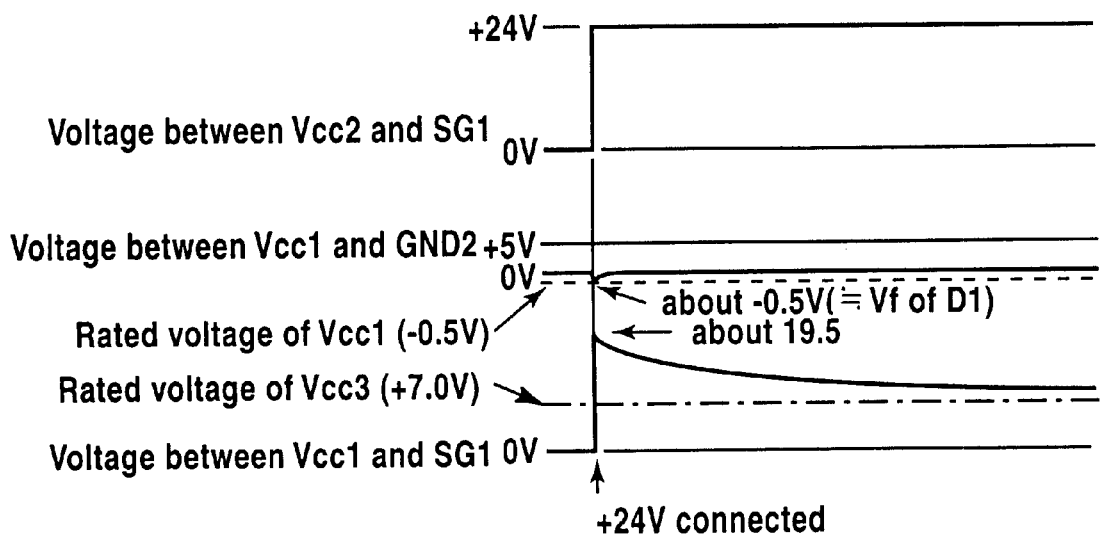
FIGS. 8A and 8B are graphs showing a voltage waveform in the second abnormal state.
Figure 8B:
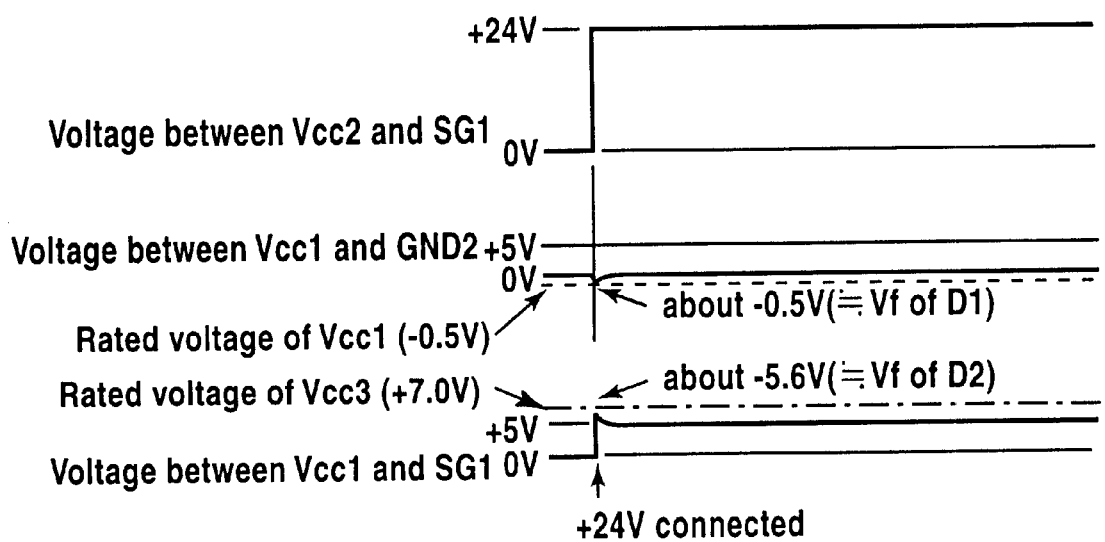

FIGS. 8A and 8B are graphs showing a voltage waveform in the second abnormal state. FIG. 8A is a graph showing a voltage waveform when the Zener diode D2 is not connected. In FIG. 8A, when a +24 V operating voltage is applied between the Vcc2 terminal of the motor driver IC 21 and the SG1, the voltage between the Vcc1 terminal of the motor driver IC 21 and the GND2 terminal falls and is about –0.5 V because the diode D1 is provided. When the +5 V pins are not connected, the current flows along the SG1 line 204, so that a voltage of approximately +19.5 V, which is obtained by subtracting from +24 V a predetermined voltage drop (about 4 V) and the forward direction voltage (0.5 V) of the diode D1, is applied between the SG1 and the Vcc3 terminal of the logic circuit 23, at the same potential as that at the Vcc1 terminal. That is, the same voltage of approximately +19.5 V is applied between the SG1 and the Vcc3 terminal of the logic circuit 23. Since this voltage exceeds the rated voltage (7 V) of the Vcc3 terminal of the logic circuit 23, the logic circuit 23 may be damaged.

FIG. 8B is a graph showing a voltage waveform when the Zener diode D2 is connected. In FIG. 8B, if, as in FIG. 8A, an operating voltage of +24 V is applied between the Vcc2 terminal of the motor driver IC 21 and the SG1, the voltage between the Vcc1 terminal and the GND2 terminal corresponds to the forward direction voltage (about –0.5 V) of the diode D1, and falls within the rated voltage (–0.5 V) for the Vcc1 terminal. Further, the voltage between the Vcc1 terminal (or the Vcc3 terminal) of the SG1 corresponds to that (e.g., 5.6 V) of the Zener diode D2 because the current flows through the Zener diode D2 in the reverse direction, as indicated by the broken line in FIG. 6B. Therefore, the voltage falls within the rated voltage for the Vcc3 terminal of the logic circuit 23, and damage to the logic circuit 23 can be avoided. As a result, even when the main apparatus 10 is in the power-ON state, the optional apparatus 20 can be attached to or removed from the main apparatus 10, without damaging the logic circuit 23.

Figure 9:
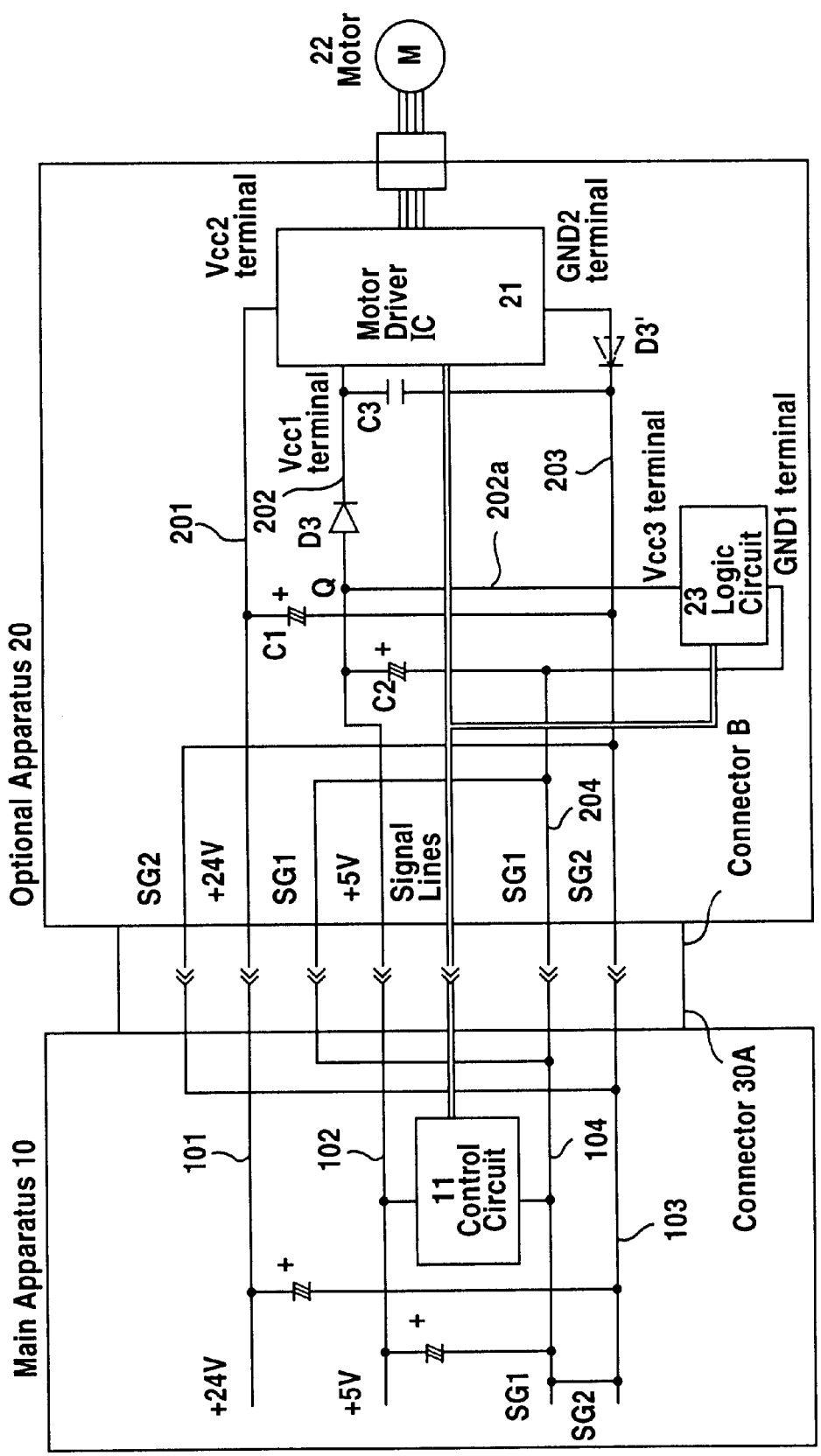
FIG. 9 is a circuit diagram illustrating an optional apparatus according to a third embodiment of the present invention.

FIG. 9 is a circuit diagram illustrating an optional apparatus according to a third embodiment of the present invention. In FIG. 9, instead of the diode D1 for the first embodiment, which is located to connect the SG2 line 203 and the +5 power line 202, a rectifying diode D3 is located along the +5 V power line 202. In other words, the diode D3 is connected in series with the motor driver IC 21.

More specifically, the diode D3 is located along the +5 V power line 202 between the Vcc1 terminal and the branch point Q, so that the direction leading from the branch point Q to the Vcc1 terminal is the forward direction. When the diode D3 is not provided, and only the SG2 pins are not connected, i.e., in the first abnormal state, the current flows in the same manner as in FIG. 4, and the voltage waveform is the same as is shown in FIG. 5A.

Figure 10:
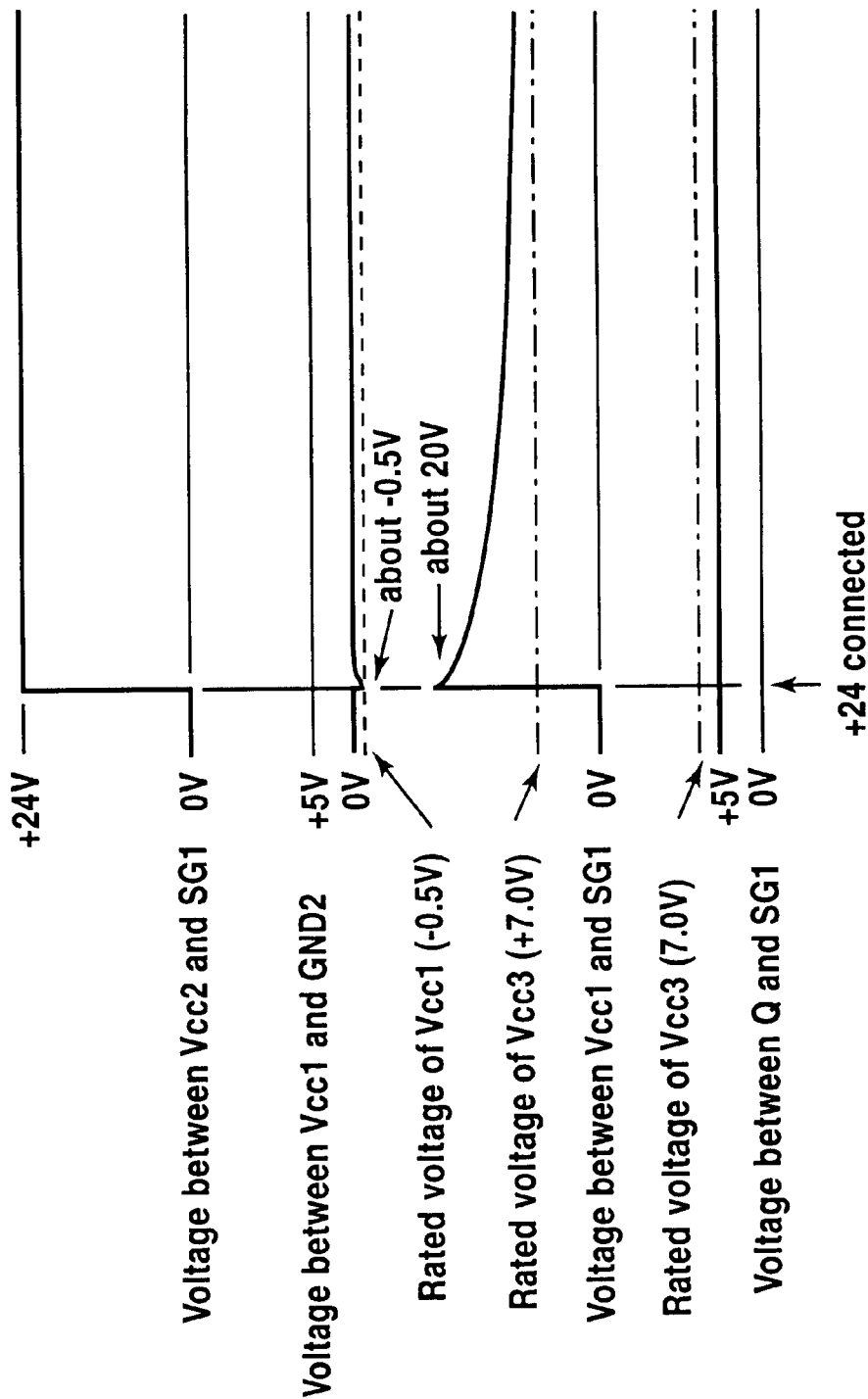
FIG. 10 is a graph showing a voltage waveform in the second abnormal state.

FIG. 10 is a graph showing a voltage waveform according to the third embodiment of the present invention. FIG. 10 corresponds to FIG. 5B. In FIG. 10, if, as in FIG. 5B, a +24 V operating voltage is applied between the Vcc2 terminal of the motor driver IC 21 and the SG1, a current does not flow in the reverse direction from the GND2 terminal to the Vcc1 terminal because the diode D3 is provided. That is, the voltage between the Vcc1 terminal and the GND2 terminal is approximately –0.5 V, in accordance with the forward direction voltage Vf (about 0.5 V) of the diode D3, and falls within the rated voltage (–0.5 V) for the Vcc1 terminal. Therefore, damage to the motor driver IC 21 can be avoided.

The voltage between the SG1 and the Vcc1 terminal or the cathode of the diode D3 is about +15 V (20 V–5 V). Therefore, if the branch point Q is located between the Vcc1 terminal and the cathode of the diode D3, the same voltage of about +15 V is applied between the Vcc3 terminal of the logic circuit 23 and the SG1. Since this voltage exceeds the rated voltage (7 V) of the Vcc3 terminal of the logic circuit 23, the logic circuit 23 may be damaged.

Therefore, the branch point Q must be located closer to the anode of the diode D3. As a result, the voltage applied to the Vcc3 terminal of the logic circuit 23 can be maintained at 5 V.

Further, instead of the diode D3, a rectifying diode D3 may be located along the SG2 line 203 before the Vcc2 terminal, so that a current flowing across the SG2 line 203 to the GND2 terminal in the reverse direction from the capacitor C1 is prevented from entering the motor driver IC 21 from the GND2 terminal.

Figure 11:
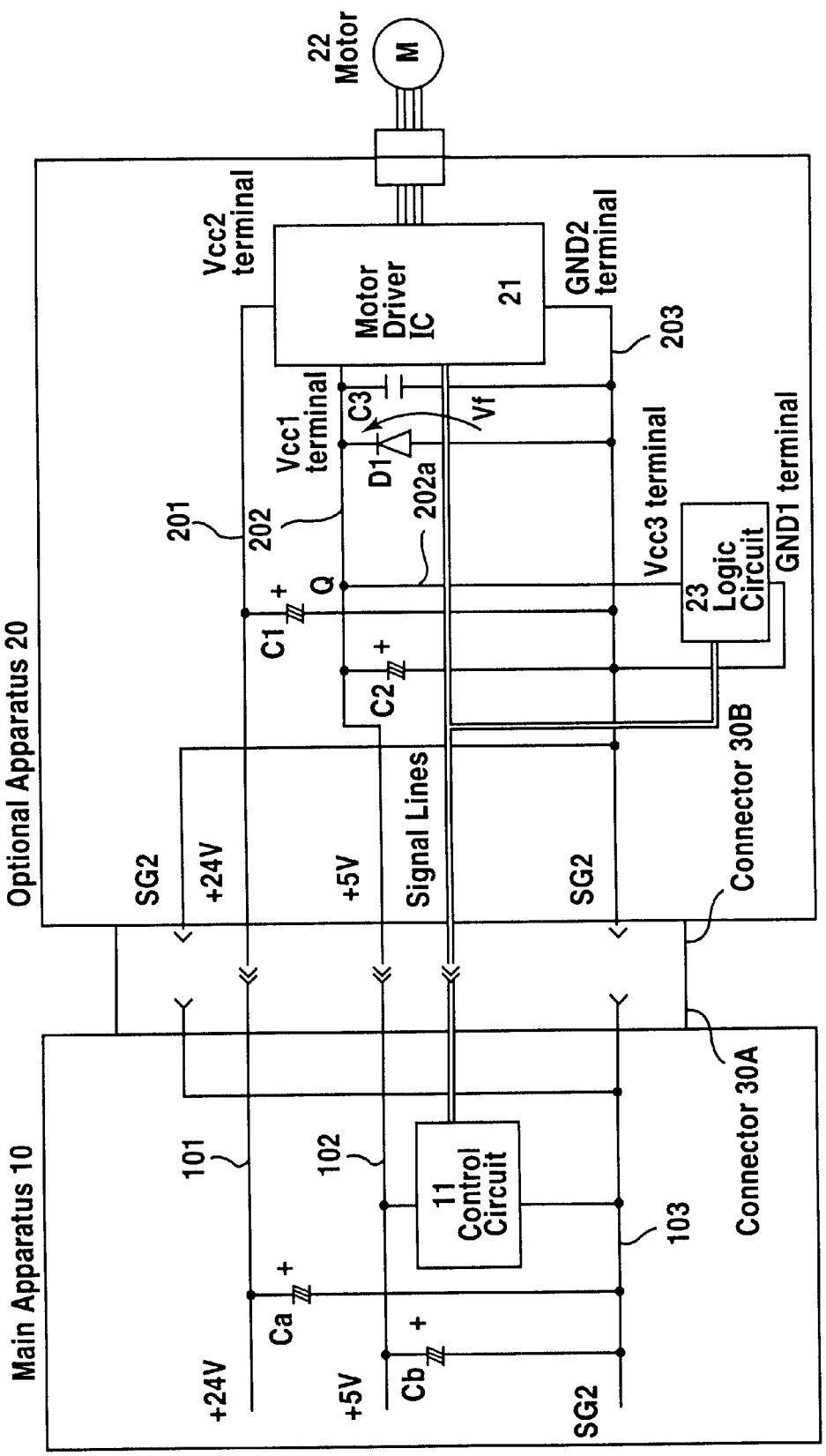
FIG. 11 is a circuit diagram illustrating an optional apparatus according to a fourth embodiment of the present invention.

FIG. 11 is a circuit diagram showing an optional apparatus according to a fourth embodiment of the present invention. In FIG. 11, the same arrangement as in FIG. 3 is employed, except that the ground terminal GND for the +24 V power source and the +5 V power source is common to the SG2 line. Therefore, in this case also, a current which flows through the capacitor C1 along the SG2 line 203 in the reverse direction passes through the diode D1 in the forward direction. That is, as in FIG. 5B, the voltage between the Vcc1 terminal and the GND2 terminal is about −0.5 V in accordance with the forward direction voltage Vf (about 0.5 V) of the diode D1, and falls within the rated voltage (−0.5 V) for the Vcc1 terminal. As a result, damage to the motor driver IC 21 can be avoided.

Figure 12:
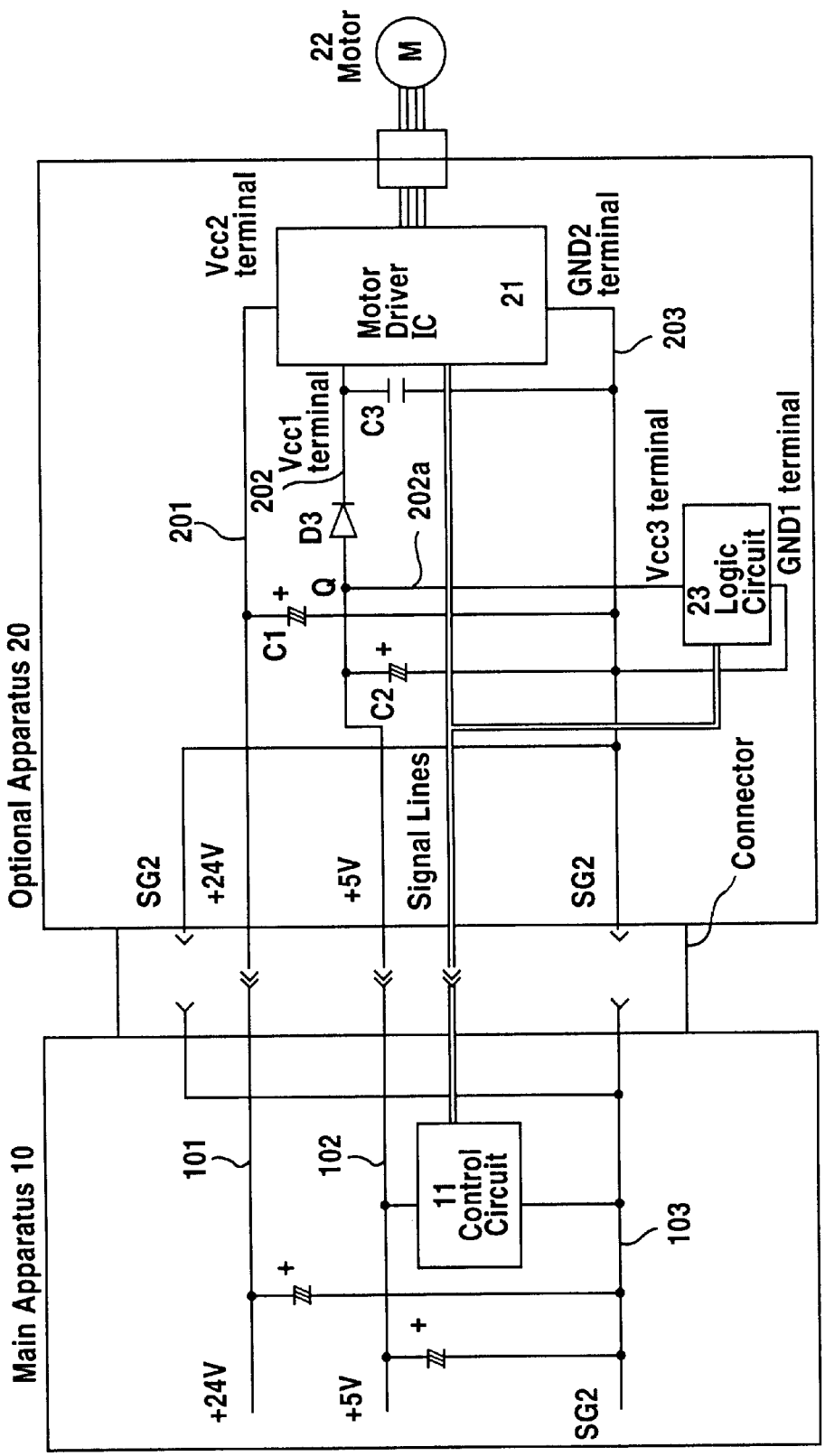
FIG. 12 is a circuit diagram illustrating an optional apparatus according to a fifth embodiment of the present invention.

FIG. 12 is a circuit diagram illustrating an optional apparatus according to a fifth embodiment of the present invention. In FIG. 12, the same arrangement as in FIG. 9 is employed, except that the ground GND terminal for the +24 V power source and the +5 V power source is common to the SG2 line. Therefore, in this case also, if, as in FIG. 10, a voltage of +24 V is applied between the Vcc2 terminal of the motor driver IC 21 and SG2, a current does not flow in the reverse direction from the GND2 terminal to the Vcc1 terminal because the diode D3 is provided. That is, the voltage between the Vcc1 terminal and the GND2 terminal is approximately −0.5 V, in accordance with the forward direction voltage Vf (about 0.5 V) of the diode D3, and falls within the rated voltage (−0.5 V) for the Vcc1 terminal. Therefore, damage to the motor driver IC 21 can be avoided. Also, in this case the branch point Q must be located closer to the anode of the diode D3.

Figure 13:
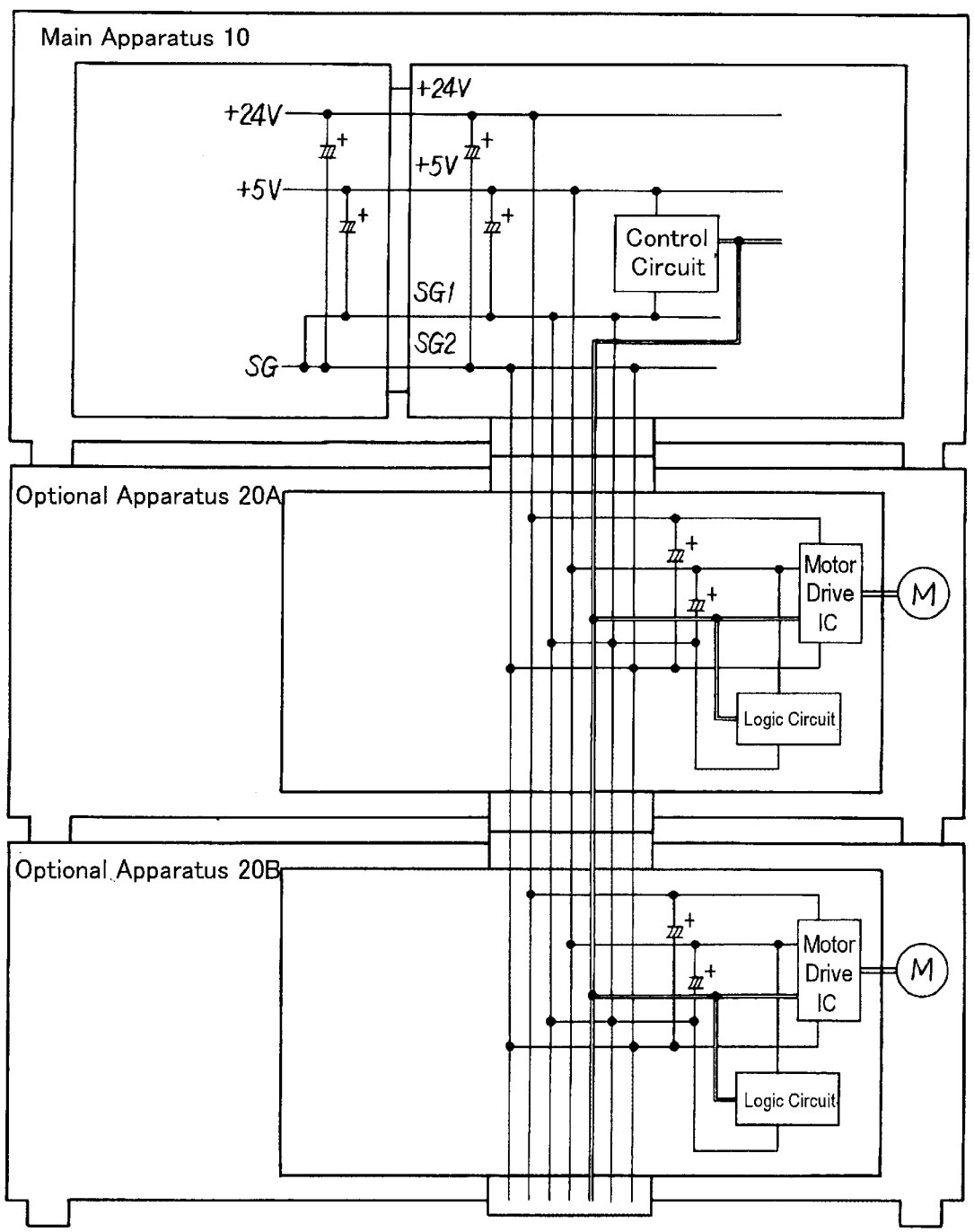
FIG. 13 is a diagram showing an example arrangement for a main apparatus and a plurality of optional apparatuses for which a connector connection is used.

FIG. 13 is a diagram showing an example arrangement for a main apparatus and a plurality of optional apparatuses connected by connectors. As is shown in FIG. 13, optional apparatuses 20A and 20B are connected in series to a main apparatus 10. Specifically, the optional apparatus 20A is connected to the main apparatus 10, and the optional apparatus 20b is connected to the optional apparatus 20A. At this time, the above individual embodiments can be applied not only for the connection between the main apparatus 10 and the optional apparatus 20A, but also for the connection between the optional apparatuses 20A and 20B.

As is described above, according to the present invention, damage to circuits, such as a motor driver IC and a logic circuit in a main apparatus accessory apparatus (optional apparatus) for which power is supplied by the main apparatus, by the application of an abnormal voltage, which is caused by the failure of a connection with the main apparatus, can be prevented. Therefore, the main apparatus accessory apparatus can be attached to and removed from the main apparatus in the power-ON state, without the circuits being damaged. The present invention is particularly effective when a main apparatus accessory apparatus is connected, using easily detachable connectors, to a main apparatus which is in the power-ON state. Damage to the circuits can be prevented by using inexpensive elements, such as a diode and a Zener diode.

The scope of the present invention is not limited to the above described embodiments, but also includes the inventions cited in the following claims and their equivalents.

What is claimed is:

1. An accessory apparatus which is connected to a main apparatus and receives power from a power source of the main apparatus, comprising:

a connector including a first terminal to be connected to a first power potential of the main apparatus, a second terminal to be connected to a second power potential of the main apparatus, and a third terminal to be connected to a ground potential of the main apparatus;

a first circuit to be connected to said first, second and third terminals; and a first device for preventing said first circuit from being applied a voltage higher than a rated voltage of said first circuit in a direction from said third terminal to said first terminal in case that said second terminal is connected to the second power potential of the main apparatus with said first terminal being connected to the first power potential of the main apparatus, without said third terminal being connected to the ground potential of the main apparatus.

2. The accessory apparatus according to claim 1, wherein said first device is an element which is connected in parallel to said first circuit between said third terminal and said first terminal, and which conducts a current in a direction from said third terminal to said first terminal.

3. The accessory apparatus according to claim 1, wherein said first device is an element which is connected in series to said first circuit between said third terminal and said first terminal, and which conducts a current in a direction from said first terminal to said third terminal.

4. The accessory apparatus according to claim 2, wherein said element is a rectifying diode, of which a forward voltage is equal to or lower than a rated voltage of said first circuit.

5. The accessory apparatus according to claim 2, wherein said connector includes a fourth terminal to be connected to said ground potential of the main apparatus, said accessory apparatus further comprising:

a second circuit to be connected to said first and said fourth terminals; and a second device for preventing said second circuit from being applied a voltage higher than the rated voltage of said second circuit in a direction from said first terminal to said fourth terminal in case that said second terminal is connected to said second power potential of the main apparatus with said fourth terminal being connected to the ground potential of the main apparatus, without said first terminal being connected to the first power potential of the main apparatus, without said third terminal being connected to the ground potential of the main apparatus.

6. The accessory apparatus according to claim 5, wherein said second device is an element which is connected in parallel to said second circuit between said first terminal and said fourth terminal, and which conducts a current in a direction from said first terminal to said fourth terminal.

7. The accessory apparatus according to claim 6, wherein said element is a Zener diode.

8. The accessory apparatus according to claim 1, wherein said connector engages directly a connector provided for the main apparatus without a cable being used.

* * * * *